United States Patent
Bostick et al.

(10) Patent No.: US 10,339,771 B2
(45) Date of Patent: Jul. 2, 2019

(54) THREE-DIMENSIONAL HOLOGRAPHIC VISUAL AND HAPTIC OBJECT WARNING BASED ON VISUAL RECOGNITION ANALYSIS

(71) Applicant: International Business Machines Corporation, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: International Business Machines Coporation, Armonk, NY (US)

( * ) Notice: Subject to any disclaimer, the term of this patent is extended or adjusted under 35 U.S.C. 154(b) by 111 days.

(21) Appl. No.: 15/423,652

(22) Filed: Feb. 3, 2017

(65) Prior Publication Data
US 2018/0225935 A1   Aug. 9, 2018

(51) Int. Cl.
| | |
|---|---|
| *G08B 6/00* | (2006.01) |
| *G03H 1/00* | (2006.01) |
| *G06K 9/00* | (2006.01) |
| *G08B 5/36* | (2006.01) |
| *G03H 1/22* | (2006.01) |

(52) U.S. Cl.
CPC .............. *G08B 6/00* (2013.01); *G03H 1/0005* (2013.01); *G03H 1/2249* (2013.01); *G06K 9/00369* (2013.01); *G06K 9/00771* (2013.01); *G08B 5/36* (2013.01); *G03H 2001/0061* (2013.01); *G03H 2001/226* (2013.01); *G06K 9/00342* (2013.01)

(58) Field of Classification Search
None
See application file for complete search history.

(56) References Cited

U.S. PATENT DOCUMENTS

| | | | |
|---|---|---|---|
| 7,190,496 B2 | 3/2007 | Kung et al. | |
| 7,701,439 B2 * | 4/2010 | Hillis | G03H 1/0005 345/156 |
| 9,756,604 B1 * | 9/2017 | Levesque | G08B 6/00 |
| 9,767,613 B1 * | 9/2017 | Bedikian | G06T 19/006 |
| 2012/0113223 A1 | 5/2012 | Hilliges et al. | |
| 2013/0078624 A1 * | 3/2013 | Holmes | C12Q 1/00 435/6.11 |
| 2014/0071506 A1 | 3/2014 | Han et al. | |
| 2014/0170735 A1 * | 6/2014 | Holmes | G01N 21/07 435/287.1 |
| 2014/0201666 A1 * | 7/2014 | Bedikian | G06F 3/017 715/771 |
| 2016/0018985 A1 | 1/2016 | Bennet et al. | |
| 2016/0239080 A1 * | 8/2016 | Marcolina | G06F 3/011 |

(Continued)

OTHER PUBLICATIONS

Jeffrey, "New Ultrasound research creates holographic objects that can be seen and felt", New Atlas, Dec. 2, 2014, 4 pages. http://newatlas.com/ultrasound-3d-haptic-hologram/35032/.

(Continued)

*Primary Examiner* — Reza Aghevli
(74) *Attorney, Agent, or Firm* — Yee & Associates, P.C.; Brian Restauro

(57) ABSTRACT

Presenting a haptic hologram warning is provided. An indication that a first individual who needs supervision is approaching a situation is received. A haptic hologram is presented to the first individual who needs supervision prior to the first individual reaching the situation.

25 Claims, 10 Drawing Sheets

(56) References Cited

U.S. PATENT DOCUMENTS

2017/0032630 A1* 2/2017 Gervais ................. G08B 6/00
2017/0068213 A1* 3/2017 Rhee .................... G06F 3/011
2017/0293259 A1* 10/2017 Ochiai ................ G03H 1/0005

OTHER PUBLICATIONS

Long et al., "Rendering Volumetric Haptic Shapes in Mid-Air sing Ultrasound", AMC Transactions on Graphics, vol. 33, No. 6, Article 181, Nov. 2014, 20 pages.

* cited by examiner

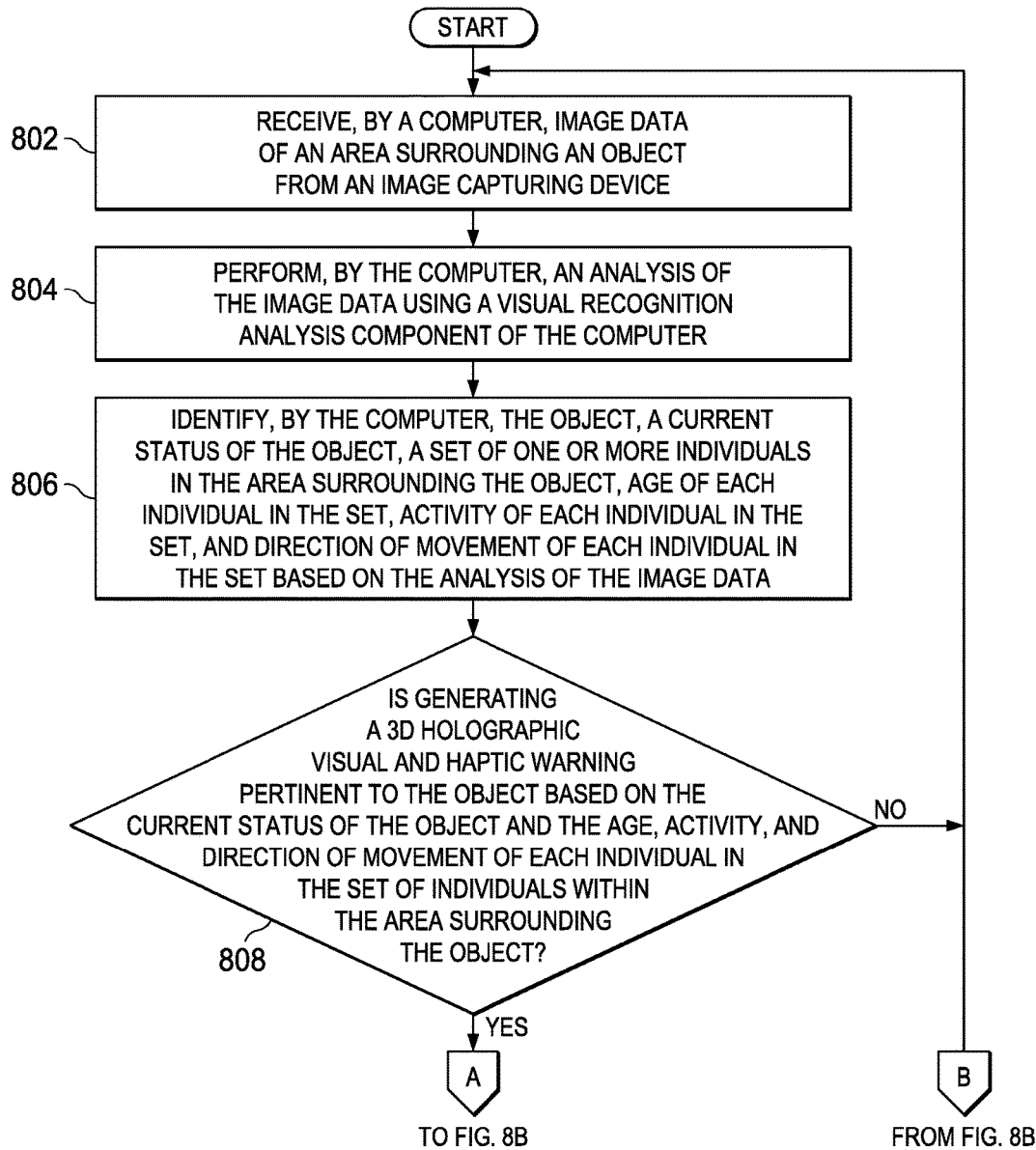

THREE-DIMENSIONAL HOLOGRAPHIC VISUAL AND HAPTIC OBJECT WARNING BASED ON VISUAL RECOGNITION ANALYSIS

BACKGROUND

1. Field

The disclosure relates generally to holograms and more specifically to generating a three-dimensional holographic visual and haptic object warning based on visual recognition analysis of image data corresponding to an area surrounding a set of one or more monitored objects.

2. Description of the Related Art

The word haptic refers to the sense of touch. Haptic feedback is the use of the sense of touch in a user interface design to provide information to a user. Typically, haptic feedback stimulates a person's sense of touch, generally created by actuators or motors that generate a vibratory sensation in the hand of the person. For example, a rumble pack for a game controller provides haptic feedback through a user's hands.

Emerging technology is making use of projected ultrasound to generate three-dimensional (3D) objects that can be seen and felt in mid-air. This tactile sensation works by using forced ultrasound from an array of ultrasound transducers to generate and focus patterns of ultrasound to shape the air at which it was directed. These patterns of forced ultrasound induce a shear wave in skin tissue, creating a displacement, which triggers mechanoreceptors in the skin similar to feeling a solid object. Additionally, these air shapes can be made visible by directing the manipulated air through a thin layer of fluid, such as, for example, oil or water.

SUMMARY

According to one illustrative embodiment, a computer-implemented method for presenting a haptic hologram warning is provided. A computer receives an indication that a first individual who needs supervision is approaching a situation. The computer presents a haptic hologram to the first individual who needs supervision prior to the first individual reaching the situation. According to other illustrative embodiments, a computer system and computer program product for presenting a haptic hologram warning are provided.

BRIEF DESCRIPTION OF THE DRAWINGS

FIGS. 8A-8B are a flowchart illustrating a process for determining a shape and size of a 3D holographic visual and haptic object warning in accordance with an illustrative embodiment.

DETAILED DESCRIPTION

Figure 1:
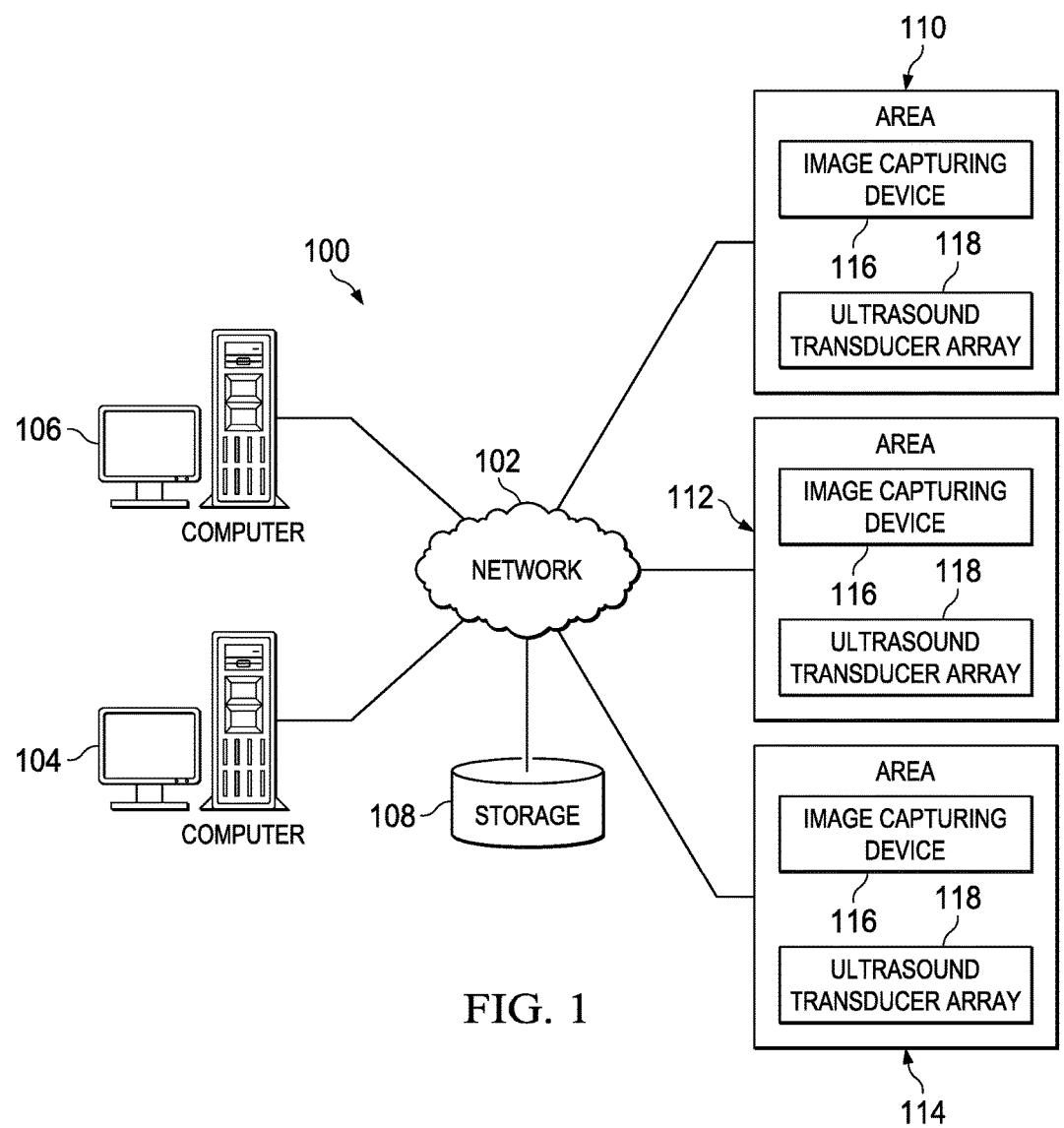
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
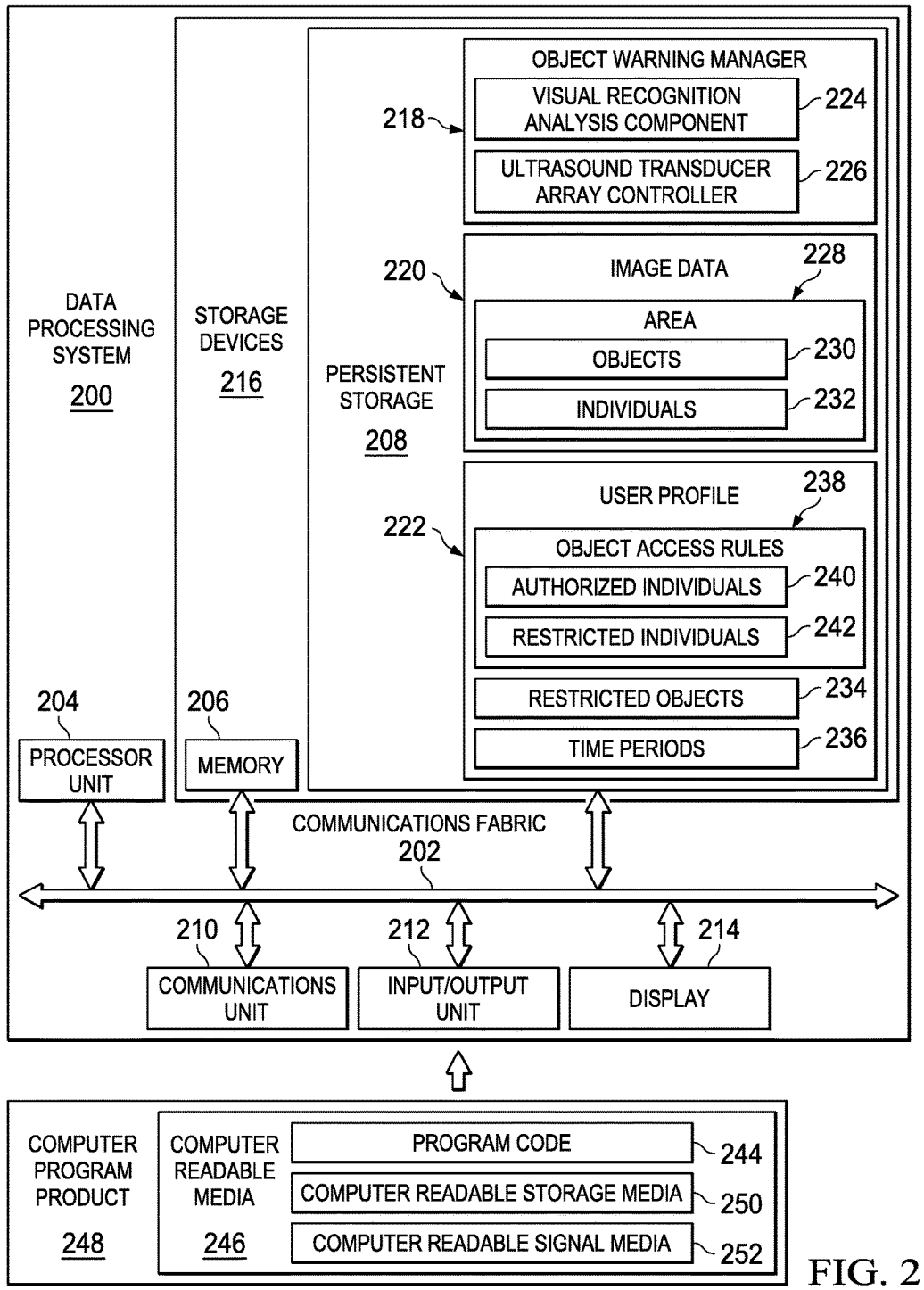
FIG. 2 is a diagram of a data processing system in which illustrative embodiments may be implemented.
Figure 3:
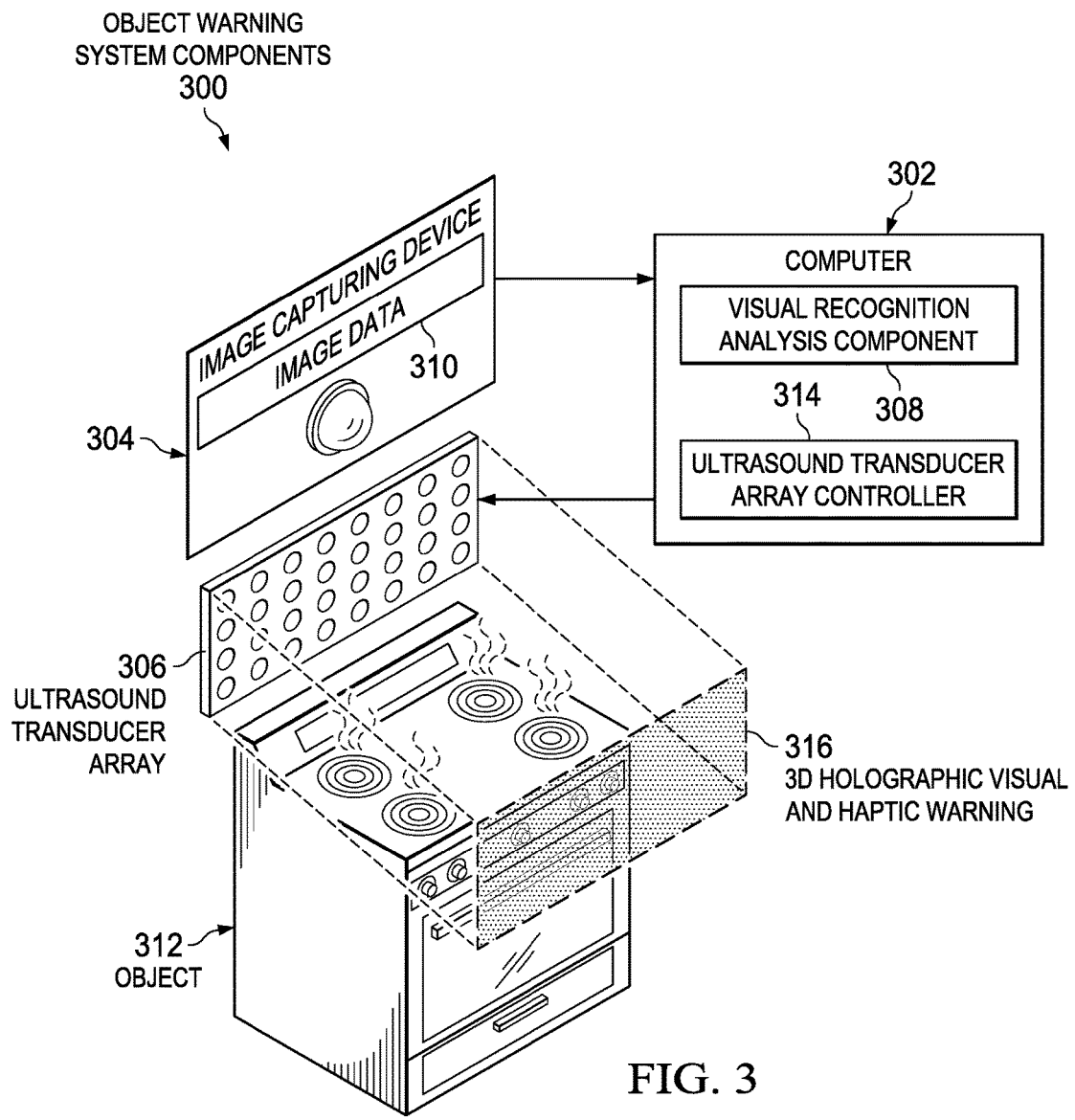
FIG. 3 is a diagram illustrating an example of object warning system components in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, image capturing devices, ultrasound transducer arrays, and other devices in which the illustrative embodiments may be implemented. Network data processing system 100 contains network 102, which is the medium used to provide communications links between the computers, data processing systems, image capturing devices, ultrasound transducer arrays, and other devices connected together within network data processing system 100. Network 102 may include connections, such as, for example, wire communication links, wireless communication links, and fiber optic cables.

In the depicted example, computer 104 and computer 106 connect to network 102, along with storage 108. Computer 104 and computer 106 may be, for example, computers with high-speed connections to network 102. In addition, computer 104 and computer 106 may be, for example, desktop or personal computers, laptop computers, handheld computers, such as tablet computers, network computers, and the like. Also, it should be noted that computer 104 and computer 106 may represent other types of data processing systems, such as, for example, personal digital assistants, smart phones, smart watches, gaming devices, set-top boxes, and the like.

Further, network data processing system 100 may be implemented in a structure, such as, for example, a residence, such as a house or apartment, an office space, a building, a set of two or more buildings, or the like. Furthermore, these structures may include a set of one or more defined areas, such as area 110, area 112, and area 114. Area 110, area 112, and area 114 may represent different rooms or other types of defined or partitioned areas within a structure.

Each of area 110, area 112, and area 114 include image capturing device 116 and ultrasound transducer array 118. Each image capturing device 116 may be, for example, a video camera, a still picture camera, an infrared camera, or any type or combination of devices capable of capturing images. Each image capturing device 116 captures images of its corresponding area, such as area 110, area 112, or area 114. The images may be, for example, real time streaming images, series of still images taken at predetermined time intervals, or a combination of both.

Each of ultrasound transducer array 118 represents an array of ultrasound transducers that is configured to generate a three-dimensional (3D) holographic visual and haptic warning spatially-adjacent to an object, such as a hot stove, an exposed sharp cutting utensil, broken glass, and the like, within a corresponding area, such as area 110, area 112, or area 114. A 3D holographic visual and haptic warning is a signal or alert, which can be seen and felt by an individual or person entering a space occupied by the 3D holographic visual and haptic warning, associated with a monitored object within an area.

Each of image capturing device 116 and each of ultrasound transducer array 118 also connect to network 102. Image capturing device 116 and ultrasound transducer array 118 are client devices of computer 104 and/or computer 106. In other words, each of image capturing device 116 sends captured image data of its corresponding area to computer 104 and/or computer 106 for processing and analysis. In addition, each of ultrasound transducer array 118 receives control signals from computer 104 and/or computer 106 to generate a 3D holographic visual and haptic object warning based on the analysis of the received image data from an image capturing device. Furthermore, computer 104 and/or computer 106 may provide information, such as software applications, programs, and updates to image capturing device 116 and ultrasound transducer array 118.

Storage 108 is a network storage device capable of storing any type of data in a structured format or an unstructured format. In addition, storage 108 may represent a plurality of network storage devices. Further, storage 108 may store identifiers for a plurality of image capturing devices and ultrasound transducer arrays, user profiles, lists of different defined areas, lists of objects to monitor in respective areas, lists of restricted objects within areas, lists of individuals with authorized access to restricted objects, lists of individuals with no access rights to restricted objects, and the like. Furthermore, storage unit 108 may store other types of data, such as authentication or credential data that may include user names, passwords, access codes, and/or biometric data associated with users and system administrators, for example.

In addition, it should be noted that network data processing system 100 may include any number of computers, data processing systems, image capturing devices, ultrasound transducer arrays, storage devices, and other devices not shown. Program code located in network data processing system 100 may be stored on a computer readable storage medium and downloaded to a computer or other data processing device for use. For example, program code may be stored on a computer readable storage medium on computer 104 and downloaded to one or more of image capturing device 116 over network 102 for use on image capturing device 116.

In the depicted example, network data processing system 100 may be implemented as a number of different types of communication networks, such as, for example, an internet, an intranet, a local area network (LAN), a personal area network (PAN), a wireless fidelity (Wi-Fi) network, a peer-to-peer (P2P) network, and a wide area network (WAN). FIG. 1 is intended as an example only, and not as an architectural limitation for the different illustrative embodiments.

With reference now to FIG. 2, a diagram of a data processing system is depicted in accordance with an illustrative embodiment. Data processing system 200 is an example of a computer, such as computer 104 in FIG. 1, or other type of data processing system in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores object warning manager 218, image data 220, and user profile 222. However, it should be noted that even though object warning manager 218 is illustrated as residing in persistent storage 208, in an alternative illustrative embodiment object warning manager 218 may be a separate component of data processing system 200. For example, object warning manager 218 may be a hardware component coupled to communication fabric 202 or a combination of hardware and software components.

Object warning manager 218 determines when to generate a 3D holographic visual and haptic object warning and a size and shape of the object warning based on an analysis of received image data from an image capturing device corresponding to an area surrounding a set of one or more monitored objects. In this example, object warning manager 218 includes visual recognition analysis component 224 and ultrasound transducer array controller 226. However, it should be noted that object warning manager 218 may include fewer or more components than illustrated. For example, visual recognition analysis component 224 and ultrasound transducer array controller 226 may be combined into one component and/or object warning manager 218 may include other components not shown.

Image data 220 represents image data received from an image capturing device, such as image capturing device 116 in FIG. 1, which corresponds to area 228. Area 228 may be, for example, area 110 in FIG. 1. Area 228 includes objects 230 and individuals 232. Objects 230 represent a set of one or more objects in area 228. Individuals 232 represent a set of one or more individuals in area 228. Image data 220 includes images of objects 230 and individuals 232.

Object warning manager 218 utilizes visual recognition analysis component 224 to process and analyze image data 220 received from the image capturing device to identify objects 230 and individuals 232 in area 228, which corresponds to image data 220. Visual recognition analysis component 224 identifies a current state and status of objects 230 in area 228, such as, for example, whether each heating element object on a stove top in area 228 is hot or cold. Further, visual recognition analysis component 224 identifies each individual of individuals 232 in area 228, along with the age of each respective individual, activity being performed by each respective individual, and a direction of movement of each respective individual in relation to objects 230 being monitored in area 228.

Object warning manager 218 utilizes ultrasound transducer array controller 226 to send control signals to an ultrasound transducer array, such as ultrasound transducer array 118 in FIG. 1. Ultrasound transducer array controller 226 controls generation of a 3D holographic visual and haptic warning by the ultrasound transducer array to alert an individual to an object in area 228 that may present a potential danger to the individual, for example. Object warning manager 218 directs ultrasound transducer array controller 226 to generate the 3D holographic visual and haptic warning using the ultrasound transducer array based on the analysis of image data 220 received from visual recognition analysis component 224.

User profile 222 contains information corresponding to a user of data processing system 200. It should be noted that user profile 222 may represent a plurality of different user profiles. The information in user profile 222 may include, for example, restricted objects 234, time periods 236, and object access rules 238. Restricted objects 234 represent a list of one or more objects, such as a birthday cake, that the user of data processing system 200 wants to limit access to in area 228. Time periods 236 represent a set of one or more time periods that the user wants to limit access to restricted objects 234 during the periods of time defined by time periods 236. For example, the user may not want others to have access to a birthday cake until the date and time of the birthday party. As another example, the user may not want anyone, including the user, to have access to a kitchen refrigerator between the hours of 8:00 p.m. and 6:00 a.m. the next morning for diet and/or health reasons.

Object access rules 238 represent rules for allowing or restricting access to objects 230 in area 228 by individuals 232. Object access rules 238 include authorized individuals 240 and restricted individuals 242. Authorized individuals 240 represent a list of individuals that the user authorizes to access restricted objects 234 or one or more of objects 230 in area 228. Restricted individuals 242 represent a list of individuals that the user wants to limit access to restricted objects 234 or one or more of objects 230 in area 228. Object warning manager 218 may utilize the information contained in user profile 222 to determine whether to generate a 3D holographic visual and haptic object warning in addition to, or instead of, the image data analysis information received from visual recognition analysis component 224.

Communications unit 210, in this example, provides for communication with other computers, data processing systems, and devices via a network, such as network 102 in FIG. 1. Communications unit 210 may provide communications using both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra-high frequency, microwave, Wi-Fi, Bluetooth® technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 244 is located in a functional form on computer readable media 246 that is selectively removable and may be loaded onto or transferred to data processing system 200 for running by processor unit 204. Program code 244 and computer readable media 246 form computer program product 248. In one example, computer readable media 246 may be computer readable storage media 250 or computer readable signal media 252. Computer readable storage media 250 may include, for example, an optical or magnetic disc that is inserted or placed into a drive or other device that is part of persistent storage 208 for transfer onto a storage device, such as a hard drive, that is part of persistent storage 208. Computer readable storage media 250 also may take the form of a persistent storage, such as a hard drive, a thumb drive, or a flash memory that is connected to data processing system 200. In some instances, computer readable storage media 250 may not be removable from data processing system 200.

Alternatively, program code 244 may be transferred to data processing system 200 using computer readable signal media 252. Computer readable signal media 252 may be, for example, a propagated data signal containing program code 244. For example, computer readable signal media 252 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 244 may be downloaded over a network to persistent storage 208 from another device or data processing system through computer readable signal media 252 for use within data processing system 200. For instance, program code stored in a computer readable storage media in a data processing system may be downloaded over a network from the data processing system to data processing system 200. The data processing system providing program code 244 may be a server computer, a client computer, or some other device capable of storing and transmitting program code 244.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 250 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Illustrative embodiments generate 3D holographic visual and haptic object warnings in mid-air in response to real time current conditions surrounding a set of one or more monitored objects in a defined area. These 3D holographic object warnings have both a visual quality (i.e., an individual can see them) and a haptic quality (i.e., an individual can feel them). Through cognitive visual analysis of image data corresponding to a given area surrounding the set of monitored objects, illustrative embodiments determine whether one or more visual and haptic 3D holographic warnings are needed for one or more of the set of monitored objects in the given area. Illustrative embodiments generate the 3D holographic visual and haptic warnings based on the analysis of the image data corresponding to the given area.

For example, illustrative embodiments may generate a visual and haptic 3D holographic warning to discourage a child from touching a shape knife on a kitchen surface, highlight where broken glass is located on a floor, discourage an adult from accessing a kitchen refrigerator at midnight, or indicate that a birthday cake is not to be touched until the birthday party. However, it should be noted that illustrative embodiments may selectively allow an adult who is cooking access to a hot stove without generating a visual and haptic 3D holographic warning, while generating a visual and haptic 3D holographic warning to a child approaching the hot stove. Even though the generated 3D hologram does not physically obstruct an individual, the generated 3D hologram does provide both a visual and haptic 3D holographic warning to the individual. As the individual enters an area and perceives the 3D hologram by sight, touch, or both, illustrative embodiments provide the individual with a warning to a nearby potentially dangerous object or a user-designated object with restricted access. Illustrative embodiments provide the visual warning, which an individual sees, via generation of a 3D hologram. Illustrative embodiments provide the haptic warning, which the individual feels, as the individual enters the space occupied by the 3D hologram.

Further, illustrative embodiments differentiate between different individuals and potentially dangerous situations and safe situations in an area. For example, a knife on a work surface in an area is typically a safe situation for an adult, but is a potentially dangerous situation if the knife is within reach of a young child. Furthermore, illustrative embodiments may dynamically modify or change 3D holographic visual and haptic warnings to adapt to changing conditions in an area based on cognitive visual recognition analysis of real time streaming image data of the area.

With reference now to FIG. 3, a diagram illustrating an example of object warning system components is depicted in accordance with an illustrative embodiment. Object warning system components 300 represent hardware and software components for providing 3D holographic visual and haptic object warnings. Object warning system components 300 may be implemented in a network of data processing systems, such as network data processing system 100 in FIG. 1.

In this example, object warning system components 300 includes computer 302, image capturing device 304, and ultrasound transducer array 306. Computer 302 may be, for example, computer 104 in FIG. 1 or data processing system 200 in FIG. 2. Image capturing device 304 and ultrasound transducer array 306 may be, for example, image capturing device 116 and ultrasound transducer array 118 in FIG. 1.

Computer 302 utilizes visual recognition analysis component 308 to receive and analyze image data 310 from image capturing device 304. Visual recognition analysis component 308 may be, for example, visual recognition analysis component 224 in FIG. 2. Visual recognition analysis component 308 provides cognitive interpretation of image data 310 to detect situations where a warning needs to be generated between object 312 and one or more individuals in the area surrounding object 312.

Image capturing device 304 generates, for example, real time streaming image data corresponding to the area surroundings object 312. In this example, object 312 is a stove. However, it should be noted that object 312 may represent any type of monitored object.

Computer 302 utilizes ultrasound transducer array controller 314 to control generation of 3D holographic visual and haptic warning 316 via ultrasound transducer array 306. Ultrasound transducer array 306 focuses patterns of ultrasound to shape 3D holographic visual and haptic warning 316 in mid-air, which creates a warning that can be seen and felt by an individual approaching object 312. It should be noted that object 312 is within an ultrasound pattern output range of ultrasound transducer array 306. Ultrasound transducer array controller 314 varies the size and shape of 3D holographic visual and haptic warning 316 depending on the current conditions and circumstances in the area surrounding object 312.

Figure 4:
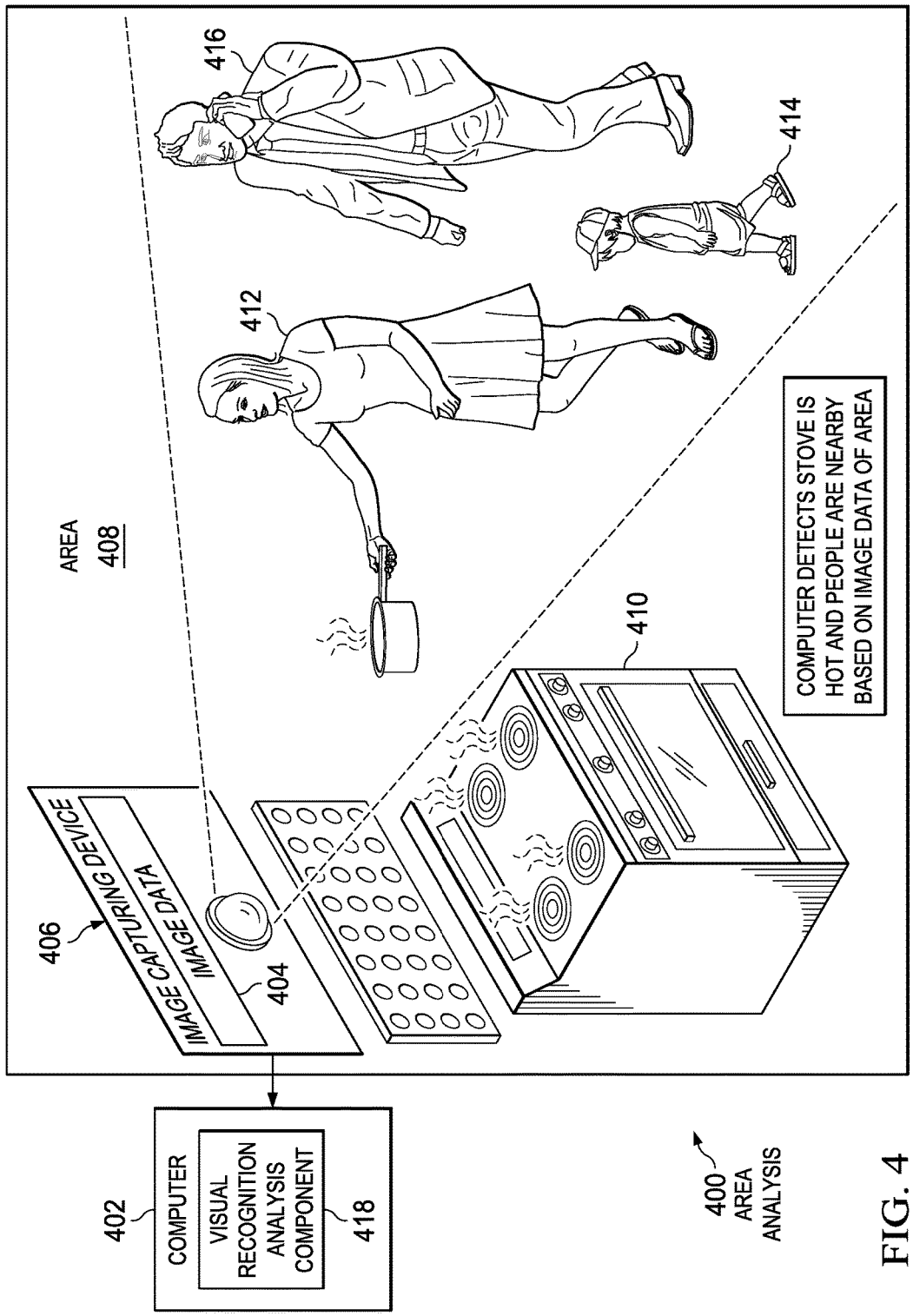
FIG. 4 is a diagram illustrating an example of area analysis in accordance with an illustrative embodiment.

With reference now to FIG. 4, a diagram illustrating an example of area analysis is depicted in accordance with an illustrative embodiment. Area analysis 400 is performed by computer 402 based on analysis of image data 404 received from image capturing device 406, which corresponds to area 408 surrounding object 410. Area 408 may represent, for example, a kitchen in a house or apartment. In addition, a set of one or more individuals, such as individual 412, individual 414, and individual 416, may occupy area 408 surrounding object 410.

Image data 404 may be, for example, real time streaming video data corresponding to area 408. Computer 402 utilizes visual recognition analysis component 418 to interpret image data 404 using cognitive deep learning to understand the content and context of the images. Thus, visual recognition analysis component 418 can determine factors, such as who is in a frame, the person's age, the person's activity, and the person's direction of movement in area 408, and generate tags or classifiers that identify area 408 and object 410 contained within image data 404.

In this example, image data 404 includes images of: object 410 (i.e., a stove with all heating elements turned on and hot); individual 412 having an age range of 35-44 and performing the activity of cooking; individual 414 having an age range of less than 12 and performing the activity of running; and individual 416 having an age range of 35-44 and performing the activity of using a handheld mobile device while walking.

Figure 5:
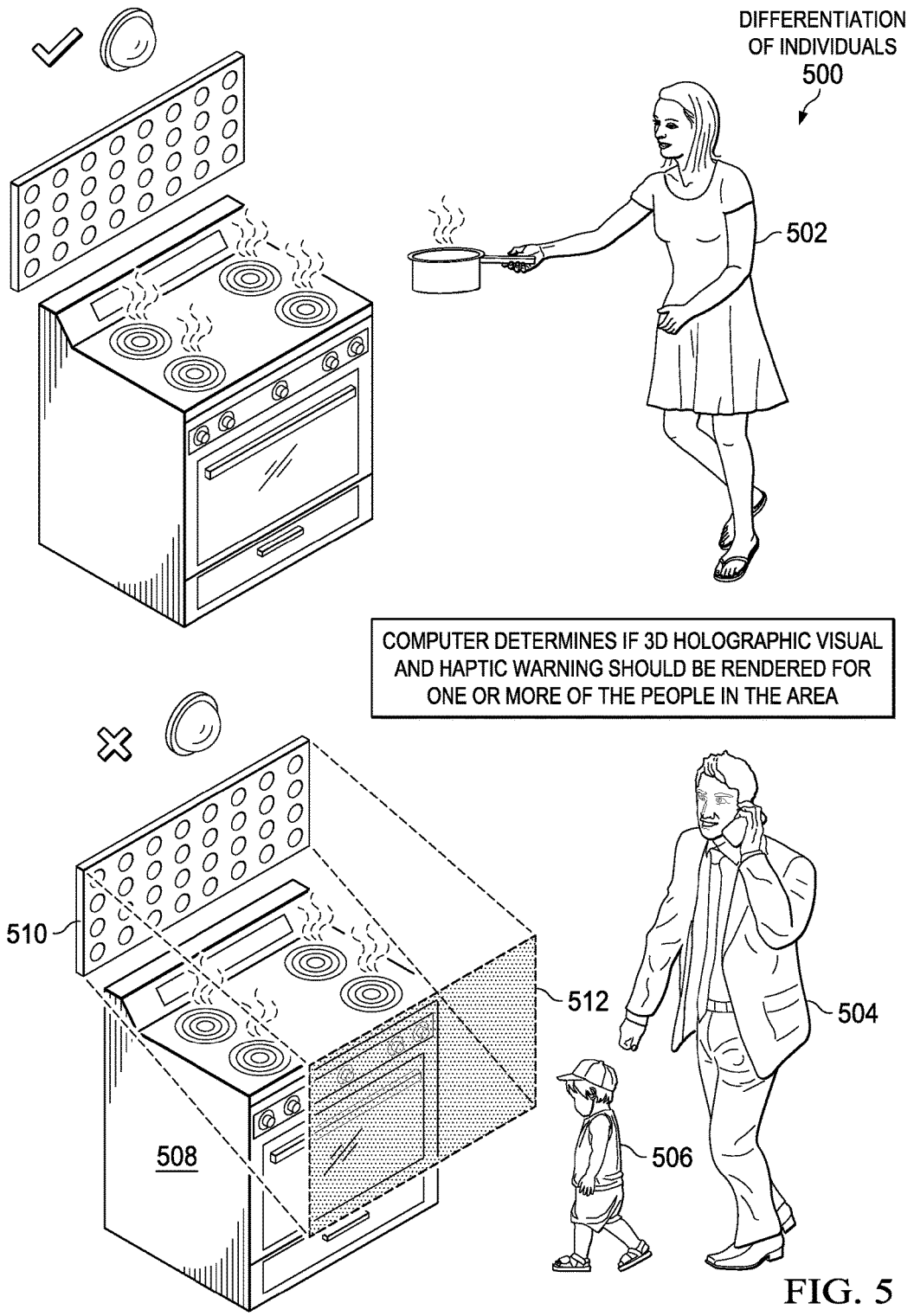
FIG. 5 is a diagram illustrating an example of differentiation of individuals in accordance with an illustrative embodiment.

With reference now to FIG. 5, a diagram illustrating an example of differentiation of individuals is depicted in accordance with an illustrative embodiment. Differentiation of individuals 500 is performed by a computer, such as, for example, computer 402 in FIG. 4. After performing area analysis 400 in FIG. 4 and classifying the objects and individuals in the area, the computer determines whether to generate a 3D holographic visual and haptic object warning based on the current conditions and circumstances in the area.

Factors that the computer may utilize in making this determination may include object warning pertinence or relevance. For example, the computer may rate a potentially dangerous object, such as, for example, a turned on stove with hot heating elements, higher as needing a warning as compared to a less dangerous object, such as, for example, a turned off stove with cold heating elements.

Age appropriateness also may be a factor. In other words, the age of each individual near an object may affect the need for a warning. For example, the computer may generate a warning for a child in the area, whereas the computer may not warn an adult in the same area.

Engaged activity also may be a factor. In other words, what each nearby individual is doing in the area also matters. For example, the computer does not warn individual 502 holding a saucepan from using the hot stove. However, the computer warns individual 504 not paying attention while using a mobile phone in the area and individual 506 running in the area.

Direction of movement also may be a factor. In other words, whether an individual is moving toward object 508 or moving away from object 508. For example, if an individual, such as individual 506, is approaching object 508, the computer may determine that the need for a warning is higher.

The computer uses ultrasound transducer array 510 to generate 3D holographic visual and haptic warning 512 between object 508 and individuals 504 and 506 based on age and activities of individuals 504 and 506. Ultrasound transducer array 510 may be, for example, ultrasound transducer array 306 in FIG. 3. In the example, ultrasound transducer array 510 is an 8×4 array of ultrasound transducers. However, it should be noted that ultrasound transducer array 510 is only meant as an example and not as a limitation on different illustrative embodiments. In other words, ultrasound transducer array 510 may include any number of ultrasound transducers and in any type of configuration to produce 3D holographic visual and haptic warning 512.

Figure 6:
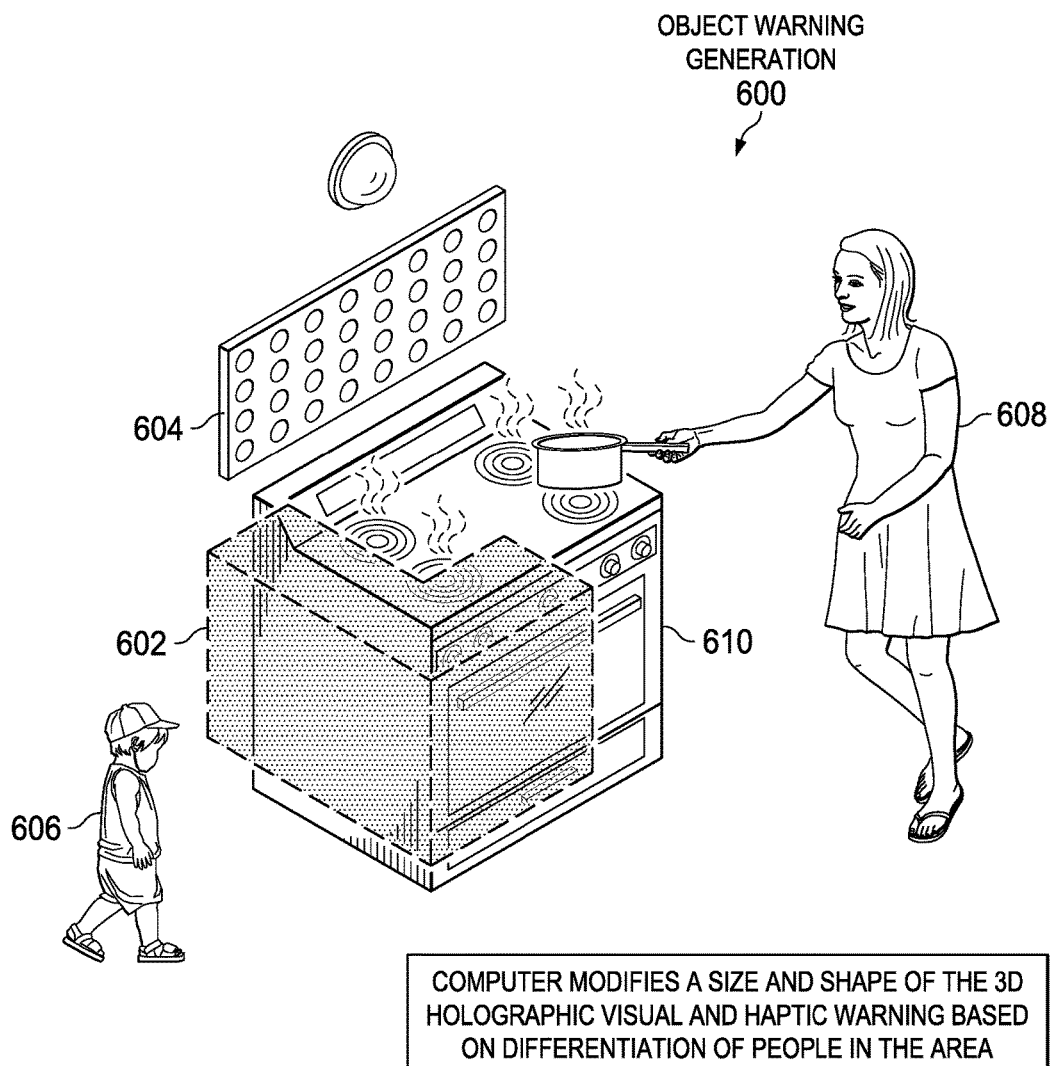
FIG. 6 is a diagram illustrating an example of object warning generation in accordance with an illustrative embodiment.

With reference now to FIG. 6, a diagram illustrating an example of object warning generation is depicted in accordance with an illustrative embodiment. Object warning generation 600 is performed by a computer, such as, for example, computer 402 in FIG. 4. After performing differentiation of individuals 500 in FIG. 5 and determining that an object warning is needed, the computer determines a size and shape of 3D holographic visual and haptic object warning 602 to generate. The computer utilizes ultrasound transducer array 604 to generate 3D holographic visual and haptic object warning 602.

The size and shape of 3D holographic visual and haptic object warning 602 should conceal, or otherwise provide a visual and haptic warning, to a nearby individual who the computer determines is in need of a warning. If there are multiple individuals in the area, the size and shape of 3D holographic visual and haptic object warning 602 can reflect that. In this example, individual 606 (i.e., running child) and individual 608 (i.e., cooking adult) are shown in the vicinity of object 610 (i.e., a hot stove). The computer determines that individual 608 needs access to object 610, whereas individual 606 needs a warning. The size and shape of 3D holographic visual and haptic object warning 602 reflects this situation. Further, the computer may modify the intensity of the haptic feel of 3D holographic visual and haptic object warning 602. For example, the computer may increase or decrease the sensation individual 606 feels based on the computer determining the level or degree of danger posed to individual 606 by object 610.

In this example, the computer visually and haptically warns individual 606 of potentially dangerous object 610, but does not warn individual 608. In addition, the computer continuously analyzes new streaming video content as it is received. As a result, the computer may change or modify 3D holographic visual and haptic object warning 602 based on changing conditions and circumstances in the area surrounding object 610. For example, the computer may continue to modify the size and shape of 3D holographic visual and haptic object warning 602 as individuals continue to move around object 610. Further, as a state of object 610 changes (e.g., the stove is now turned off and heating elements are cool), the computer may remove or stop generation of 3D holographic visual and haptic object warning 602. As the computer detects new objects, individuals, conditions, circumstances, and/or potential dangers, the computer may add new 3D holographic visual and haptic object warnings in the area.

Figure 7:
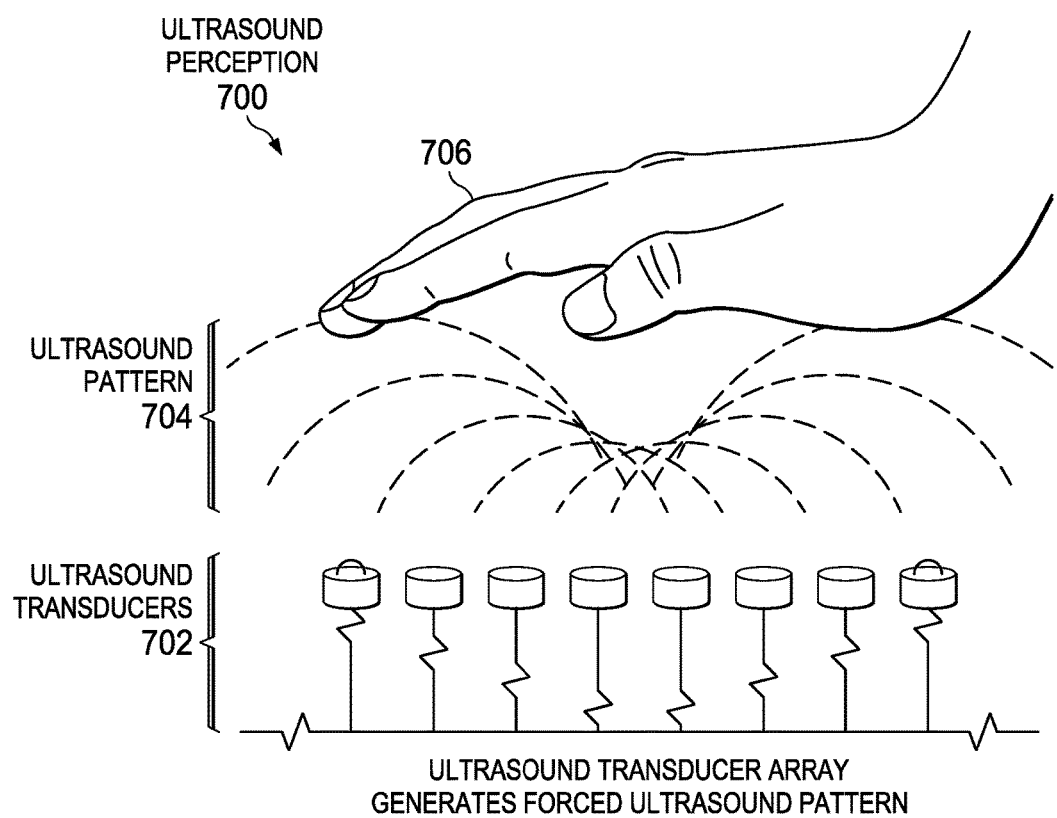
FIG. 7 is a diagram illustrating an example of ultrasound perception in accordance with an illustrative embodiment.

With reference now to FIG. 7, a diagram illustrating an example of ultrasound perception is depicted in accordance with an illustrative embodiment. Ultrasound perception 700 illustrates how ultrasound transducers 702 generate ultrasound pattern 704. Individual 706 perceives ultrasound pattern 704 as individual 706 enters a space occupied by ultrasound pattern 704. However, it should be noted that even though a hand of individual 706 is shown in this example as perceiving ultrasound patter 704, any portion of individual 706's body may perceive ultrasound pattern 704.

Figure 8B:
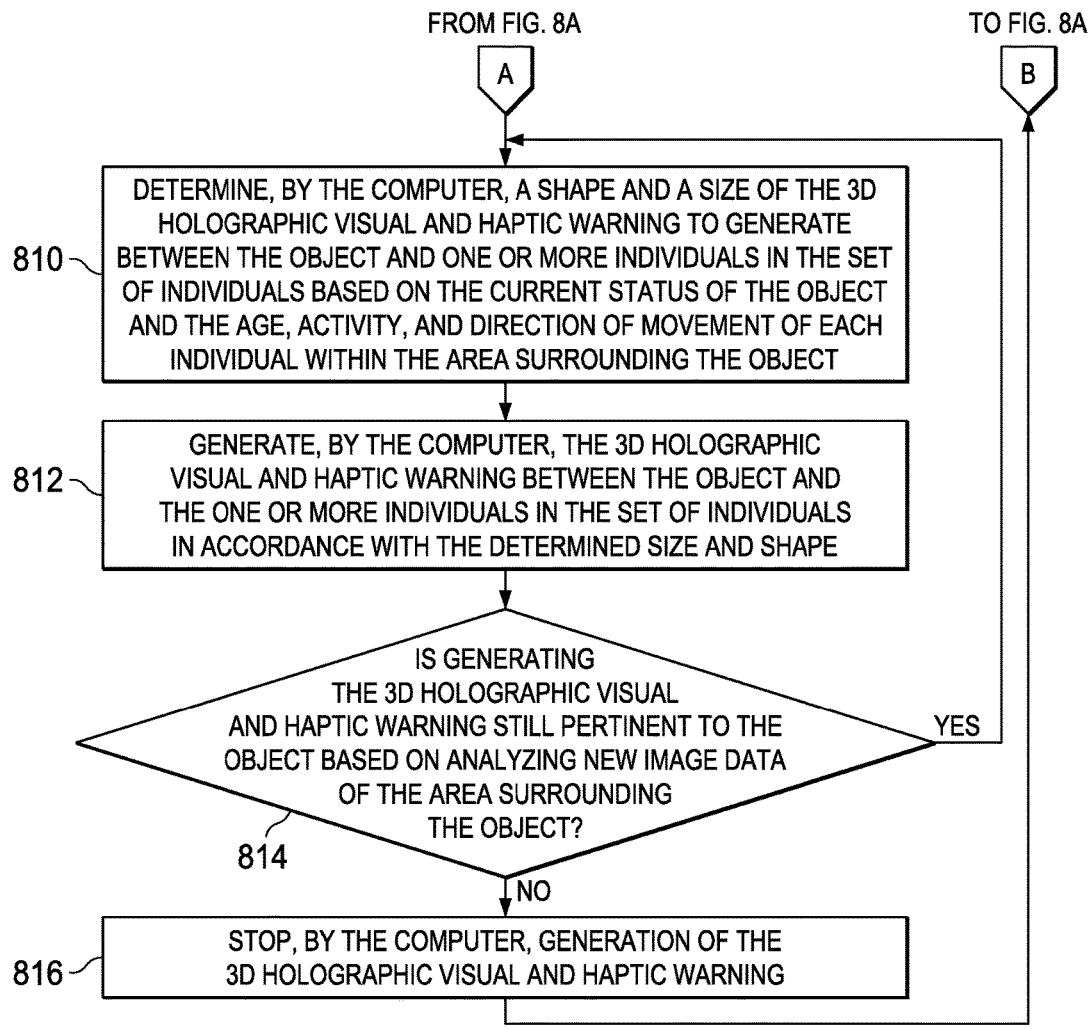

With reference now to FIGS. 8A-8B, a flowchart illustrating a process for determining a shape and size of a 3D holographic visual and haptic object warning is shown in accordance with an illustrative embodiment. The process shown in FIGS. 8A-8B may be implemented in a computer, such as, for example, computer 104 in FIG. 1, data processing system 200 in FIG. 2, or computer 402 in FIG. 4.

The process begins when the computer receives image data of an area surrounding an object from an image capturing device (step 802). The image data of the area surrounding the object from the image capturing device may be, for example, image data 404 of area 408 surrounding object 410 from image capturing device 406. Also, it should be noted that the image data may be real time continuously streaming image data of the area. In addition, the computer performs an analysis of the image data using a visual recognition analysis component of the computer, such as visual recognition analysis component 418 in FIG. 4 (step 804).

Further, the computer identifies the object, a current status of the object, a set of one or more individuals in the area surrounding the object, age of each individual in the set, activity of each individual in the set, and direction of movement of each individual in the set based on the analysis of the image data (step 806). The current status of the object may be, for example, that the object is in a turned-on state and is in an active mode of operation, such as increasing temperature in heating elements or activating paper shredding elements. The set of individuals in the area surrounding the object may be, for example, individuals 412-416 in FIG. 4. The direction of movement of each individual may be, for example, no movement (i.e., stationary), movement toward the object, movement away from the object, movement parallel to the object, and the like.

Furthermore, the computer makes a determination as to whether generating a 3D holographic visual and haptic warning is pertinent to the object based on the current status of the object and the age, activity, and direction of movement of each individual in the set of individuals within the area surrounding the object (step 808). If the computer determines that generating a 3D holographic visual and haptic warning is not pertinent to the object based on the current status of the object and the age, activity, and direction of movement of each individual in the set of individuals within the area surrounding the object, no output of step 808, then the process returns to step 802 where the computer continues to receive image data of the area. If the computer determines that generating a 3D holographic visual and haptic warning is pertinent to the object based on the current status of the object and the age, activity, and direction of movement of each individual in the set of individuals within the area surrounding the object, yes output of step 808, then the computer determines a shape and a size of the 3D holographic visual and haptic warning to generate between the object and one or more individuals in the set of individuals based on the current status of the object and the age, activity, and direction of movement of each individual within the area surrounding the object (step 810).

Afterward, the computer generates the 3D holographic visual and haptic warning between the object and the one or more individuals in the set of individuals in accordance with the determined size and shape (step 812). Moreover, the computer makes a determination as to whether generating the 3D holographic visual and haptic warning is still pertinent to the object based on analyzing new image data of the area surrounding the object (step 814). If the computer determines that generating the 3D holographic visual and haptic warning is still pertinent to the object based on analyzing the new image data of the area surrounding the object, yes output of step 814, then the process returns to step 810 where the computer continues to determine the size and shape of the 3D holographic visual and haptic warning to generate.

If the computer determines that generating the 3D holographic visual and haptic warning is not pertinent to the object based on analyzing the new image data of the area surrounding the object, no output of step 814, then the computer stops generation of the 3D holographic visual and haptic warning (step 816). Thereafter, the process returns to step 802 where the computer continues to receive image data of the area.

Figure 9:
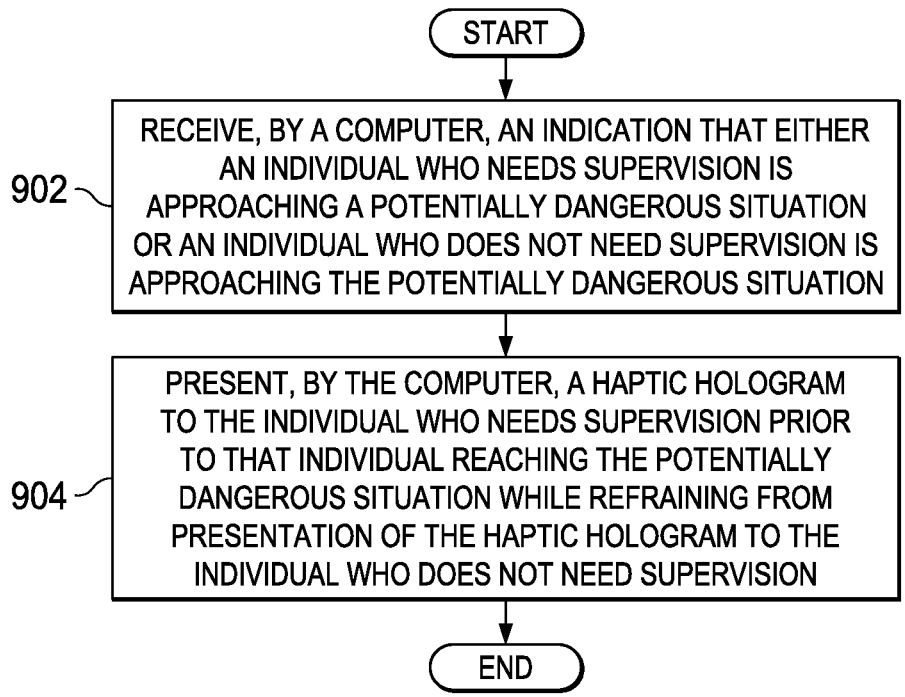
FIG. 9 is a flowchart illustrating a process for presenting a haptic hologram in accordance with an illustrative embodiment.

With reference now to FIG. 9, a flowchart illustrating a process for presenting a haptic hologram is shown in accordance with an illustrative embodiment. The process shown in FIG. 9 may be implemented in a computer, such as, for example, computer 104 in FIG. 1, data processing system 200 in FIG. 2, or computer 402 in FIG. 4.

The process begins when the computer receives an indication that either an individual who needs supervision is approaching a potentially dangerous situation or an individual who does not need supervision is approaching the potentially dangerous situation (step 902). The individual who needs supervision may be, for example, individual 606 in FIG. 6. The individual who does not need supervision may be, for example, individual 608 in FIG. 6. The dangerous situation may be, for example, object 610 in FIG. 6 being an electric stove with the heating elements turned on and hot.

The computer presents a haptic hologram to the individual who needs supervision prior to that individual reaching the potentially dangerous situation while refraining from presentation of the haptic hologram to the individual who does not need supervision (step 904). The haptic hologram may be, for example, 3D holographic visual and haptic warning 602 in FIG. 6. Thereafter, the process terminates.

Thus, illustrative embodiments of the present invention provide a computer-implemented method, computer system, and computer program product for generating a 3D holographic visual and haptic warning based on visual recognition analysis of streaming image data corresponding to an area surrounding a set of one or more monitored objects. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for presenting a haptic hologram warning, the computer-implemented method comprising:
receiving, by a computer, an indication that a first individual who needs supervision is approaching a situation; and
presenting, by the computer, the haptic hologram warning to the first individual who needs supervision prior to the first individual reaching the situation, wherein the computer modifies an intensity of the haptic hologram warning based on the computer determining a level of danger posed to the first individual by the situation.

2. The computer-implemented method of claim 1 further comprising:
receiving, by the computer, an indication that a second individual who does not need supervision is approaching the situation; and
refraining, by the computer, from presentation of the haptic hologram warning to the second individual who does not need supervision.

3. The computer-implemented method of claim 1, wherein the situation is one of a group consisting of a potentially dangerous inanimate object and a user-designated inanimate object with restricted access.

4. The computer-implemented method of claim 1 further comprising:
receiving, by the computer, image data of an area surrounding an object from an image capturing device; and
performing, by the computer, an analysis of the image data using a visual recognition analysis component of the computer.

5. The computer-implemented method of claim 4, wherein the image data is real time streaming image data of the area surrounding the object.

6. The computer-implemented method of claim 4 further comprising:
identifying, by the computer, the object, a current status of the object, a set of individuals in the area surrounding the object, age of each individual in the set, activity of each individual in the set, and direction of movement of each individual in the set based on the analysis of the image data.

7. A computer-implemented method for presenting a haptic hologram warning, the computer-implemented method comprising:
receiving, by a computer, an indication that a first individual who needs supervision is approaching a situation;
presenting, by the computer, a haptic hologram to the first individual who needs supervision prior to the first individual reaching the situation
receiving, by the computer, image data of an area surrounding an object from an image capturing device;
performing, by the computer, an analysis of the image data using a visual recognition analysis component of the computer;
identifying, by the computer, the object, a current status of the object, a set of individuals in the area surrounding the object, age of each individual in the set, activity of each individual in the set, and direction of movement of each individual in the set based on the analysis of the image data;
determining, by the computer, whether generating a three-dimensional (3D) holographic visual and haptic warning is pertinent to the object based on the current status of the object and the age, activity, and direction of movement of each individual in the set of individuals within the area surrounding the object; and
responsive to the computer determining that generating a 3D holographic visual and haptic warning is pertinent to the object based on the current status of the object and the age, activity, and direction of movement of each individual in the set of individuals within the area surrounding the object, determining, by the computer, a size and a shape of the 3D holographic visual and haptic warning to generate between the object and one or more individuals in the set of individuals.

8. The computer-implemented method of claim 7 further comprising:
generating, by the computer, the 3D holographic visual and haptic warning between the object and the one or more individuals in the set of individuals in accordance with the determined size and shape using an ultrasound transducer array in the area.

9. The computer-implemented method of claim 8 further comprising:
determining, by the computer, whether the generating of the 3D holographic visual and haptic warning is still pertinent to the object based on analyzing new image data of the area surrounding the object; and
responsive to the computer determining that the generating of the 3D holographic visual and haptic warning is not pertinent to the object based on the analyzing of the new image data of the area surrounding the object, stopping, by the computer, generation of the 3D holographic visual and haptic warning.

10. The computer-implemented method of claim 1, wherein the haptic hologram warning comprises a three-dimensional (3-D) holographic visual and haptic warning that is presented spatially-adjacent to a potentially dangerous object.

11. A computer system for presenting a haptic hologram warning, the computer system comprising:
a bus system;
a storage device connected to the bus system, wherein the storage device stores program instructions; and
a processor connected to the bus system, wherein the processor executes the program instructions to:
receive an indication that a first individual who needs supervision is approaching a situation; and
present the haptic hologram warning to the first individual who needs supervision prior to the first individual reaching the situation, wherein the computer modifies an intensity of the haptic hologram based on the computer determining a level of danger posed to the first individual by the situation.

12. The computer system of claim 11, wherein the processor further executes the program instructions to:
receive an indication that a second individual who does not need supervision is approaching the situation; and
refrain from presentation of the haptic hologram warning to the second individual who does not need supervision.

13. A computer program product for presenting a haptic hologram warning, the computer program product comprising a computer readable storage medium having program instructions embodied therewith, the program instructions executable by a computer to cause the computer to perform a method comprising:
receiving, by the computer, an indication that a first individual who needs supervision is approaching a situation; and
presenting, by the computer, the haptic hologram warning to the first individual who needs supervision prior to the first individual reaching the situation, wherein the computer modifies an intensity of the haptic hologram based on the computer determining a level of danger posed to the first individual by the situation.

14. The computer program product of claim 13 further comprising:
receiving, by the computer, an indication that a second individual who does not need supervision is approaching the situation; and refraining, by the computer, from presentation of the haptic hologram warning to the second individual who does not need supervision.

15. The computer program product of claim 13, wherein the situation is one of a group consisting of a potentially dangerous inanimate object and a user-designated inanimate object with restricted access.

16. The computer program product of claim 13 further comprising:
receiving, by the computer, image data of an area surrounding an object from an image capturing device; and
performing, by the computer, an analysis of the image data using a visual recognition analysis component of the computer.

17. The computer program product of claim 16, wherein the image data is real time streaming image data of the area surrounding the object.

18. The computer program product of claim 16 further comprising:
identifying, by the computer, the object, a current status of the object, a set of individuals in the area surrounding the object, age of each individual in the set, activity of each individual in the set, and direction of movement of each individual in the set based on the analysis of the image data.

19. A computer program product for presenting a haptic hologram warning, the computer program product comprising a non-transitory computer readable storage medium having program instructions embodied therewith, the program instructions executable by a computer to cause the computer to perform a method comprising:
receiving, by the computer, an indication that a first individual who needs supervision is approaching a situation;
presenting, by the computer, a haptic hologram to the first individual who needs supervision prior to the first individual reaching the situation;
receiving, by the computer, image data of an area surrounding an object from an image capturing device;
performing, by the computer, an analysis of the image data using a visual recognition analysis component of the computer;
identifying, by the computer, the object, a current status of the object, a set of individuals in the area surrounding the object, age of each individual in the set, activity of each individual in the set, and direction of movement of each individual in the set based on the analysis of the image data;
determining, by the computer, whether generating a three-dimensional (3D) holographic visual and haptic warning is pertinent to the object based on the current status of the object and the age, activity, and direction of movement of each individual in the set of individuals within the area surrounding the object; and
responsive to the computer determining that generating a 3D holographic visual and haptic warning is pertinent to the object based on the current status of the object and the age, activity, and direction of movement of each individual in the set of individuals within the area surrounding the object, determining, by the computer, a size and a shape of the 3D holographic visual and haptic warning to generate between the object and one or more individuals in the set of individuals.

20. The computer program product of claim 19 further comprising:
generating, by the computer, the 3D holographic visual and haptic warning between the object and the one or more individuals in the set of individuals in accordance with the determined size and shape using an ultrasound transducer array in the area.

21. The computer-implemented method of claim 4, wherein the object is an inanimate object, and further comprising:
determining whether to present the haptic hologram warning based on the analysis of the area surrounding the inanimate object.

22. The computer system of claim 11, further comprising:
an ultrasound transducer array comprising a plurality of ultrasound transducers.

23. A computer-implemented method for presenting a three-dimensional (3-D) holographic visual and haptic warning, the computer-implemented method comprising:
receiving, by a computer, an indication that a first individual who needs supervision is approaching a situation;
presenting, by the computer, the 3-D holographic visual and haptic warning to the first individual who needs supervision prior to the first individual reaching the situation;
receiving, by the computer, image data of an area surrounding an object from an image capturing device; and
performing, by the computer, an analysis of the image data using a visual recognition analysis component of the computer, wherein the object is an inanimate object, and further comprising:
determining whether to present the 3-D holographic visual and haptic warning based on the analysis of the area surrounding the inanimate object.

24. The computer-implemented method of claim 23, further comprising:
accessing a user profile comprising information corresponding to the first individual and an object access rule associated with the inanimate object.

25. The computer-implemented method of claim 24, further comprising:
differentiating between different individuals and potentially dangerous and safe situations in the area surrounding the object.

\* \* \* \* \*